F. G. KIEHL.
FOLDING CRATE.
APPLICATION FILED OCT. 13, 1916.
1,232,331.
Patented July 3, 1917.
2 SHEETS—SHEET 1.
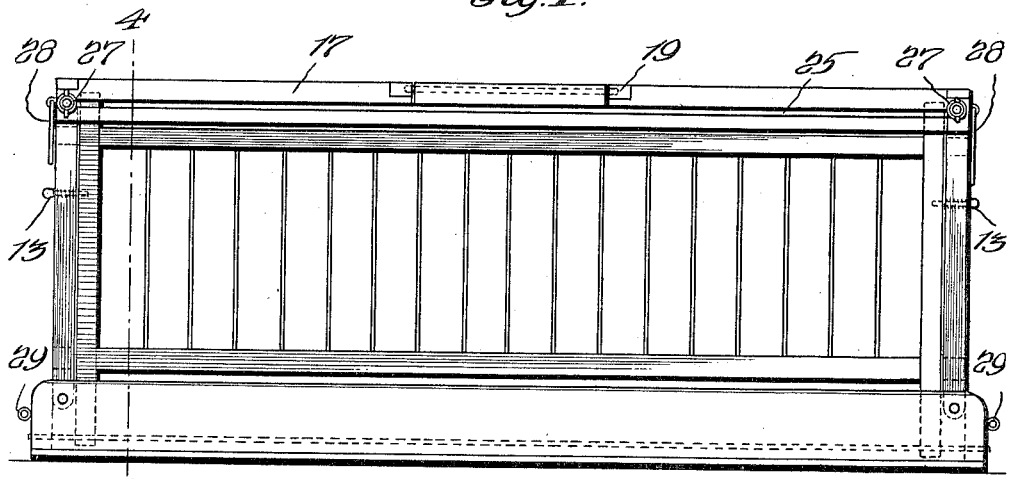
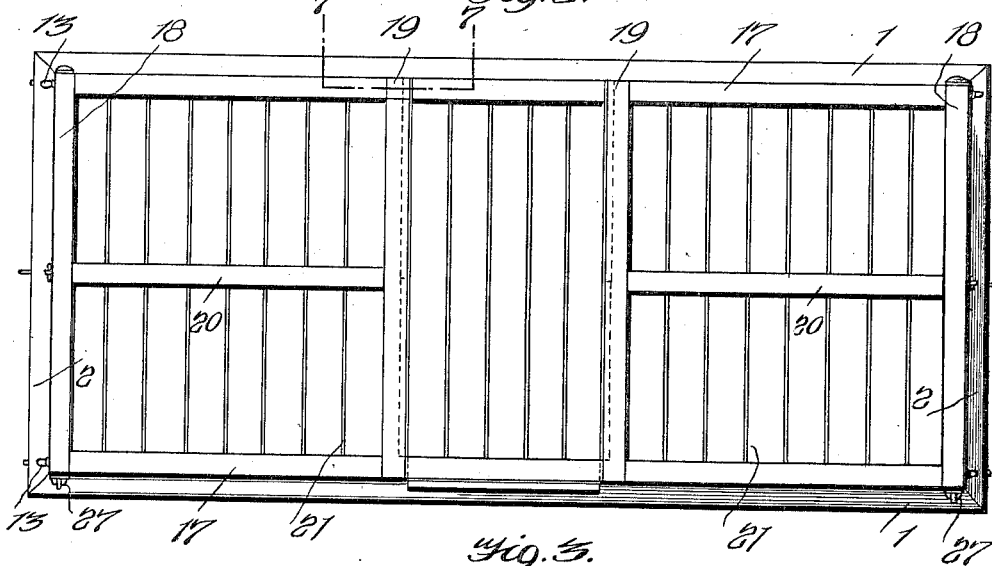
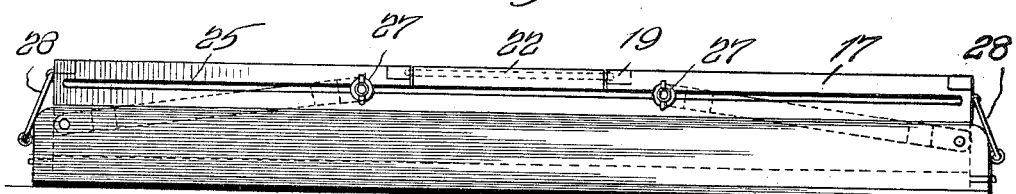
WITNESSES
INVENTOR
FRED G. KIEHL,
BY
ATTORNEYS

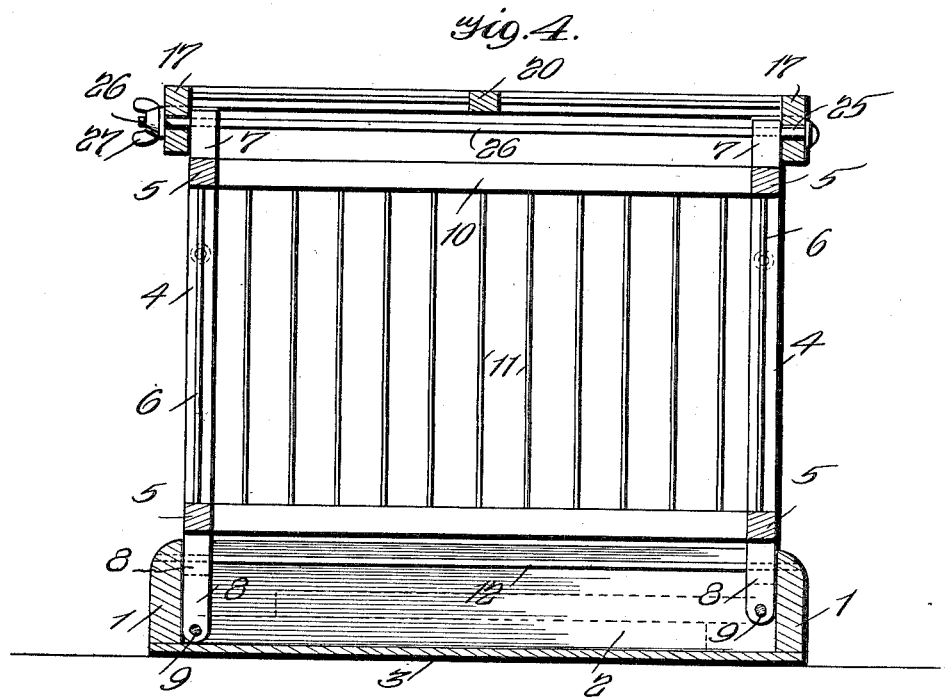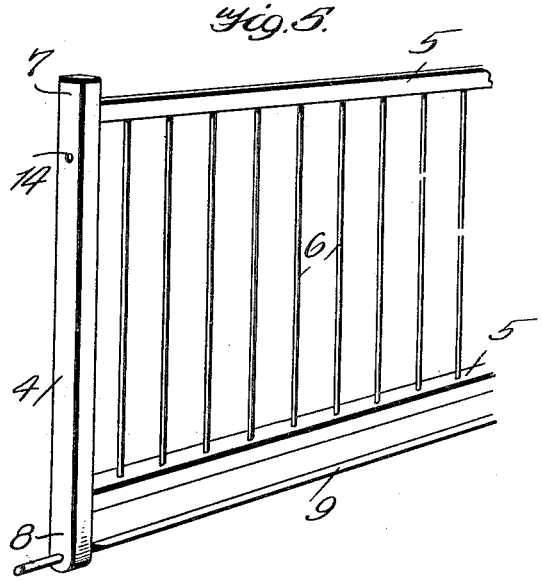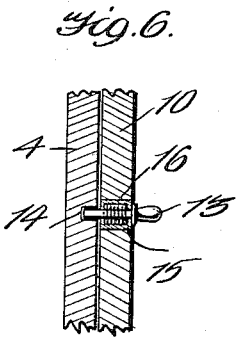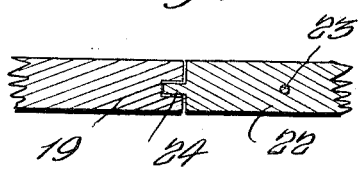

UNITED STATES PATENT OFFICE.

FRED G. KIEHL, OF MUSCOTAH, KANSAS.

FOLDING CRATE.

1,232,331.          Specification of Letters Patent.        Patented July 3, 1917.

Application filed October 13, 1916. Serial No. 125,416.

*To all whom it may concern:*

Be it known that I, FRED G. KIEHL, a citizen of the United States, and a resident of Muscotah, in the county of Atchison and State of Kansas, have invented an Improvement in Folding Crates, of which the following is a specification.

My invention is an improvement in folding crates, and has for its object to provide a crate of the character specified, adapted for holding poultry and the like, wherein the crate is arranged to be set up to form an inclosure of suitable size for containing poultry, or knocked down or collapsed into small compass for transportation, and wherein when in either position the parts are firmly locked against displacement.

In the drawings:

Figure 1 is a side view of the improved crate set up.

Fig. 2 is a top plan view.

Fig. 3 is a side view of the crate collapsed.

Fig. 4 is a section on the line 4—4 of Fig. 1.

Fig. 5 is a perspective view of a portion of one of the sides.

Fig. 6 is a sectional detail of the locking mechanism for the side.

Fig. 7 is a section on the line 7—7 of Fig. 2.

In the present embodiment of the invention a base is provided comprising side members 1 and end members 2 connected to the side members and forming a substantially rectangular frame, and a bottom 3 is connected with the under edges of the frame to complete the base. The upper edges of the frame are rounded externally as shown, and the sides and ends are arranged within the base.

The sides consist of standards 4, which are connected by upper and lower longitudinal members 5, and the longitudinal members of each side are connected by wires or bars 6. Thus each side consists of a substantially rectangular open frame in which is arranged a grating formed by the wires 6. The standards 4 are extended above the longitudinal members as indicated at 7, and below the same as indicated at 8, and the extensions 8 are hinged to the base by means of rods 9. These rods are passed through the extensions 8 and through end members 2 of the base, thus hinging the sides to the base, and the extensions 8 are of such length that while the rod of one side is near the bottom 3 the rod of the other side is spaced above the said bottom a sufficient distance to permit the last-named side to fold upon the first-named side, while the first-named side folds upon the bottom, as indicated in dotted lines in Fig. 4.

The lower longitudinal members 5 are so arranged with respect to the standards 4, that when the sides are in upright unfolded position the said longitudinal members 5 will be at the upper edges of the side members 1 of the base.

Each of the ends is a substantially rectangular frame 10, closed by wires or bars 11, and each of the said frames is hinged at its lower end to the side members 1 of the base by rods 12, the said rods being arranged similarly to the rods 9. These end frames are hinged at the same level, and in unfolded condition abut against the ends of the side frames, as shown more particularly in Fig. 2, and holding mechanism for the sides is provided in connection with the ends, the said holding mechanism being indicated in Fig. 6.

In each end member of each end is mounted a pin or bolt 13, which is adapted to engage a recess or opening 14 in the adjacent standard of the adjacent side when the parts are erect or in unfolded position. Each of the pins 13 is arranged within a casing 15 in the end frame 10, and within each casing is arranged a spring 16 which normally acts to hold the pin in engagement with the opening 14. It will be evident that when the pins 13 are released, either side may be folded inwardly, while when the sides are erect and the pins in engagement with the openings 14, the sides and the ends will be locked together against accidental displacement.

The improved crate is completed by a top consisting of a substantially rectangular frame composed of side members 17 and end members 18. On each side of the transverse center the frame is provided with guides 19 which connect the side members 17 and braces 20 extend between the end members 18 and the guides 19, midway between the sides. That portion of the top between each guide and the adjacent end member 18 is closed by wires 21, and a sliding door is mounted in the space between the guides.

These guides 19, as shown more particularly in Fig. 7, are grooved on their inner edges, and a door comprising a frame 22 closed by wires 23 is mounted to slide in the guides, the sides of the door frame having outwardly extending tongues 24 for engaging the grooves of the guides 19. Each of the side members 17 is slotted longitudinally, as indicated at 25, the said slots extending from near one end of the side member to near the other, and the slots are engaged by rods 26 fastened transversely of the ends and at the tops of the said ends.

Each of these rods is provided at one end with a head and a washer for preventing the head from passing through the adjacent slot 25, and at the other end each rod has a wing nut 27 threaded thereon, a washer being arranged between the nut and the adjacent side member 17. Thus each rod acts as a guide in connection with the slots for the top of the adjacent end. In unfolded condition these rods 26 are at the ends of the slots, as shown in Fig. 1, and it will be evident that when the wing nuts are tightened, the ends may be locked in this position during the raising and fixing of the sides.

In order to fold the crate from the position of Fig. 1 to that of Fig. 3, the pins 13 are first loosened at that side whose rod 9 is nearest the bottom 3, and the side is folded in upon the bottom. Then the pins 13 of the other side are released and the other side is folded in upon the first side as indicated in Fig. 4, in dotted lines. The wing nuts 27 are now loosened, and the tops of the ends are moved toward each other, the rods 26 moving in the slots 25, and it will be evident that the top will eventually fit down upon the base, after which the nuts 27 may be tightened to hold the parts in this position.

In order to prevent displacement of the parts or injury, hooks indicated at 28 and preferably snap hooks are pivoted to the ends of the top, and these hooks may engage with eyes 29 on the ends of the base, when the parts are in the position of Fig. 3. The hooks positively lock the parts in folded position. The door 22 may be withdrawn laterally to give access to the interior of the crate. When a crate has been emptied, it may be folded in the position of Fig. 3 for return, thus greatly reducing the bulk, and obtaining a lower classification in freight rates. The rods 9 and 12 which hinge the sides and ends to the base do not extend beyond the outer faces of the base frame, with the exception of one rod, namely, that on the side which folds above. This rod is made removable, in order that the said slide may be removed, to permit access to the interior of the crate for cleaning the same and the like.

I claim:

A crate comprising a base composed of a substantially rectangular frame and a bottom plate secured to the bottom of the frame, sides hinged within the base frame at the sides thereof and arranged to fold one upon the other within the frame, ends hinged within the base frame at the ends thereof and abutting against the ends of the sides when the crate is open, spring pressed pins in the ends and engaging the sides to hold said sides in upright position, a top including a frame having longitudinally extending slots in its sides, rods extending through the ends at the tops thereof and through the slots, nuts on the rods for clamping the ends to the top, and releaseable latch mechanism in connection with the top and engaging the bottom when the parts are folded to hold them in abutting relation.

FRED G. KIEHL.

Witnesses:
H. M. TURNER,
R. A. ALLISON.